United States Patent
Riou et al.

(10) Patent No.: US 9,932,897 B2
(45) Date of Patent: Apr. 3, 2018

(54) REMOVABLE ACOUSTIC PANELS FOR TURBOJET ENGINE CASING

(71) Applicant: SNECMA, Paris (FR)

(72) Inventors: Georges Jean Xavier Riou, Melun (FR); Norman Bruno Andre Jodet, Savigny-sur-Orge (FR); Jacky Novi Mardjono, Nogent sur Marne (FR)

(73) Assignee: SNECMA, Paris (FR)

( * ) Notice: Subject to any disclaimer, the term of this patent is extended or adjusted under 35 U.S.C. 154(b) by 325 days.

(21) Appl. No.: 14/648,745

(22) PCT Filed: Dec. 12, 2013

(86) PCT No.: PCT/FR2013/053053
§ 371 (c)(1),
(2) Date: Jun. 1, 2015

(87) PCT Pub. No.: WO2014/096634
PCT Pub. Date: Jun. 26, 2014

(65) Prior Publication Data
US 2015/0292407 A1  Oct. 15, 2015

(30) Foreign Application Priority Data

Dec. 17, 2012 (FR) .................... 12 62150

(51) Int. Cl.
*F01D 25/04* (2006.01)
*F02C 7/045* (2006.01)
(Continued)

(52) U.S. Cl.
CPC .............. *F02C 7/045* (2013.01); *F01D 25/04* (2013.01); *F01D 25/24* (2013.01); *F01D 25/246* (2013.01);
(Continued)

(58) Field of Classification Search
CPC ........ F01D 25/04; F01D 25/243; F02K 1/827; F02C 7/045; B64D 2033/0206;
(Continued)

(56) References Cited

U.S. PATENT DOCUMENTS

| 7,866,939 B2* | 1/2011 | Harper | B64D 33/02 415/119 |
| 8,186,934 B2* | 5/2012 | Humphries | F01D 25/243 415/126 |

(Continued)

FOREIGN PATENT DOCUMENTS

| EP | 1 369 555 A1 | 12/2003 |
| EP | 1 972 755 A2 | 9/2008 |

(Continued)

OTHER PUBLICATIONS

International Search Report dated Feb. 3, 2014, in PCT/FR2013/053053, filed Dec. 12, 2013.

*Primary Examiner* — Logan Kraft
*Assistant Examiner* — Sabbir Hasan
(74) *Attorney, Agent, or Firm* — Oblon, McClelland, Maier & Neustadt, L.L.P.

(57) ABSTRACT

An acoustic panel intended to be fixed internally to a fan casing of a turbojet engine, including an exterior face and an interior face which are curved about an axis, and two axially opposed transverse faces, the exterior curved face having at least one first recess on the side of a first transverse face and at least one second recess on the side of the opposite transverse face, said recesses each an attachment, in which said recesses do not open onto the interior curved face of the panel. Also covered are the turbojet engine including these panels and the method of mounting them.

16 Claims, 4 Drawing Sheets

(51) Int. Cl.
*F01D 25/24* (2006.01)
*F02K 1/82* (2006.01)
*B64D 33/02* (2006.01)

(52) U.S. Cl.
CPC ...... *F02K 1/827* (2013.01); *B64D 2033/0206* (2013.01); *F05D 2220/30* (2013.01); *F05D 2230/60* (2013.01); *F05D 2230/64* (2013.01); *F05D 2230/644* (2013.01); *F05D 2240/91* (2013.01); *F05D 2250/34* (2013.01); *F05D 2260/36* (2013.01); *F05D 2260/37* (2013.01); *F05D 2260/96* (2013.01); *Y02T 50/672* (2013.01)

(58) Field of Classification Search
CPC ............. F05D 2260/96; F05D 2230/64; F05D 2260/36; F05D 2260/37
See application file for complete search history.

(56) References Cited

U.S. PATENT DOCUMENTS

| | | |
|---|---|---|
| 2004/0007422 A1 | 1/2004 | Porte et al. |
| 2008/0226444 A1 | 9/2008 | Humphries |
| 2009/0242321 A1 | 10/2009 | Harper |
| 2009/0324390 A1 | 12/2009 | Harper et al. |
| 2010/0232932 A1 | 9/2010 | Vauchel et al. |

FOREIGN PATENT DOCUMENTS

| | | |
|---|---|---|
| EP | 2 105 597 A2 | 9/2009 |
| FR | 2 898 870 A1 | 9/2007 |

\* cited by examiner

REMOVABLE ACOUSTIC PANELS FOR TURBOJET ENGINE CASING

TECHNICAL FIELD

The present invention relates to the field of turbojet engines, and more particularly the design of the upstream portion thereof in order to attenuate noise.

DISCLOSURE OF THE PRIOR ART

One means for reducing the noise emission of a turbojet engine consists in fixing absorbent panels to the internal surface of the casing of the fan. These panels are located upstream of the fan and also serve to reconstitute the air intake duct. They occupy an annular space left clear towards the front in a maintenance operation, when the turbojet engine is separated from the nacelle. This is because the front of the fan casing comprises upstream a flange on which the air intake duct of the nacelle is fixed so that the internal surfaces thereof, with the acoustic panels, are connected in order to form the air intake duct of the turbojet engine. Moreover, downstream of this annular space, a ring of abradable material is fixed to the casing in order to limit the clearance between the fan blades and the air duct thereof.

In a solution that has already been used, the panels are bolted under the casing. This fixing mode has several drawbacks:
- weakening of the structure of the casing by the piercings necessary for the bolting;
- risks of loss of the screws used for the bolting that could seriously damage the blades;
- difficult access to the bolting locknuts outside the casing for maintenance operations.

To remedy these drawbacks, solutions by bonding without bolting have been conceived of but they have problems of reparability.

The design of the panels and fixing thereof in this environment proves to be tricky since it is necessary to obtain a mounting that is both robust and simple while optimising the space reserved for the acoustic material.

DISCLOSURE OF THE TECHNICAL PROBLEM AND OF THE INVENTION

The aim of the present invention is to maximise the efficacy of the acoustic coating while facilitating maintenance by optimising the removable function of the panels.

To this end, the invention relates to an acoustic panel to be fixed internally to the fan casing of a turbojet engine, comprising an external face and an internal face curved about an axis and two axially opposed transverse faces, the external curved face having at least one first recess on the side of a first transverse face and at least one second recess on the side of the opposite transverse face, said recesses each comprising an attachment means, characterised in that said recesses do not open onto the internal curved face of the panel.

Preferentially, the curvature on the external face of the panel corresponds to that of the internal wall of the casing around the axis of the turbojet engine and the axial length of the panel is equal to that of the annular space. In this case, the invention achieves its objective of maximising the efficacy of the acoustic coating by filling the annular space with panels formed from said material, which are pressed against the casing and which minimise the discontinuities of acoustic impedance by means of a connection contiguous with the adjoining structures to afford continuity of the walls of the air duct, the recesses being intended to house the means of fixing to the casing. Optimisation of the joins between panels in the annular space is provided by the adjusted shape thereof.

Preferably, the attachment means of the first recess comprise at least one axial embedding member, male or female. This makes it possible, when the panel is positioned at the front of the fan casing with said first recess downstream, to fix the panel by means of an embedded downstream connection and then to lock the panel upstream. In this way, it is not necessary to access the downstream connection of the panel in order to lock it or to use elements such as screws or nuts.

In a variant of the invention, the axial embedding member provided in the first recess fits flush with the external curved face. This arrangement minimises the height of the fixing means with which it cooperates and therefore optimises the volume occupied by the acoustic material.

Preferably, an attachment means arranged so as to contain at least one locking means is provided in said second recess, said second recess opening onto the corresponding transverse face through an opening with a cross section that is substantially equal to the maximum cross section of said recess. By virtue of this opening, access to the locking means is possible when the panel is in position on the casing with the corresponding face turned upstream, the nacelle having been removed, which facilitates the assembly and disassembly operations.

Advantageously, the attachment means provided in the second recess is arranged so that the locking takes place in the radial direction. This solution makes it possible to firmly lock the connections and if necessary to adjust the position of the panel in order to correct any imperfections on the casing by interposing shims. Advantage will be fully taken of said shims in an embodiment where the connection by embedding of the first recess is also suited to the use thereof.

The invention also relates to a turbojet engine comprising a fan casing, at least two acoustic panels and means for fixing to the casing that are capable of cooperating with the attachment means provided in said first and second recesses for holding said panels against the internal wall of the casing.

Preferably, said acoustic panels are arranged at one end of the casing, having the transverse face thereof located on the side of the second recess towards said end.

In this configuration, the recesses advantageously isolate the air-duct locking means when the acoustic panel is fixed to the casing and prevent unwanted loss of screws or nuts in the jet engine in operation.

According to another aspect of the invention, the fixing means are attached to the casing, inside the annular space. The robustness of the device is ensured by the fact that the fixing means do not interact with the other structures, downstream the ring, made from a material that is less robust than that of the casing, and upstream the casing fixing flange.

Advantageously, an embodiment in which the fixing means are bonded to the casing avoids weakening the structure of the casing through piercings.

The invention also relates to a method for assembling a turbojet engine in which:
- the panel is introduced from the inside against the casing so as to offer up the attachment means of the first recess in front of the fixing means with which it cooperates,
- the attachment means of said first recess is embedded in the fixing means with which it cooperates so that the attachment means of said second recess is presented in front of the fixing means with which it cooperates, said locking means is applied between the fixing means and the attachment means of said second recess.

This allows easy positioning of the acoustic panels due to the fact that, during an assembly operation, for example at the upstream end of the casing, the downstream connection allows embedding that will then be put under stress when the panel is installed in a definitive position and the upstream connection locked. It is therefore not necessary subsequently to access the means of this connection. Upstream, the casing can then be secured to the nacelle without acting on the panels.

DESCRIPTION OF AN EMBODIMENT OF THE INVENTION

Two non-limiting embodiments of the invention will now be described in more detail with reference to the accompanying drawings, in which.

Figure 1:
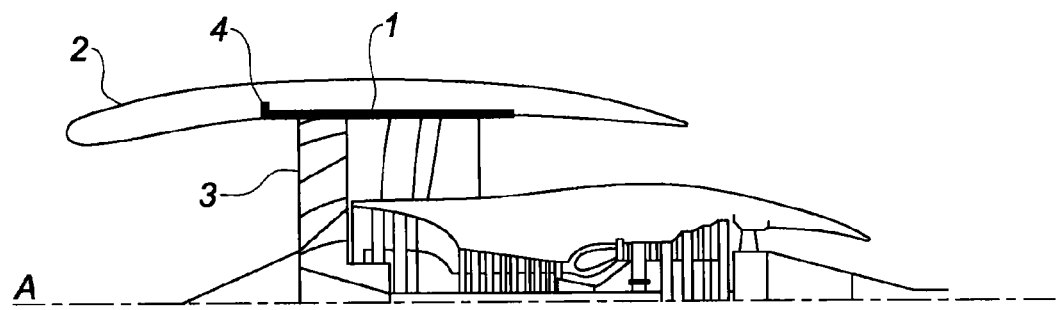
FIG. 1 is a schematic, axial half-sectional view of a turbojet engine in the nacelle thereof.

With reference to FIG. 1, this shows schematically in axial section a turbojet engine having a spin axis A, assembled with the nacelle thereof. Preferentially, this is a bypass turbojet engine, the fan of which is the first intake stage. The turbojet engine comprises a fan casing 1 which holds the nacelle 2 and forms the air duct for the flow that passes through the blades 3 of the fan. The nacelle is fixed in particular to the flange 4 of the casing in order to secure the joining thereof at the air intake duct at the intake of the turbojet engine. In order to attenuate the noise generated towards the upstream end by the turbojet engine, in particular that due to the functioning of the fan, coating the inside of the nacelle and the portion of the casing forming the air intake duct upstream of the fan with an acoustic material that absorbs noise is known. The present invention relates to the acoustic coating of the portion of the casing corresponding to the space between the flange 4 and the blades of the fan 3.

Figure 2:
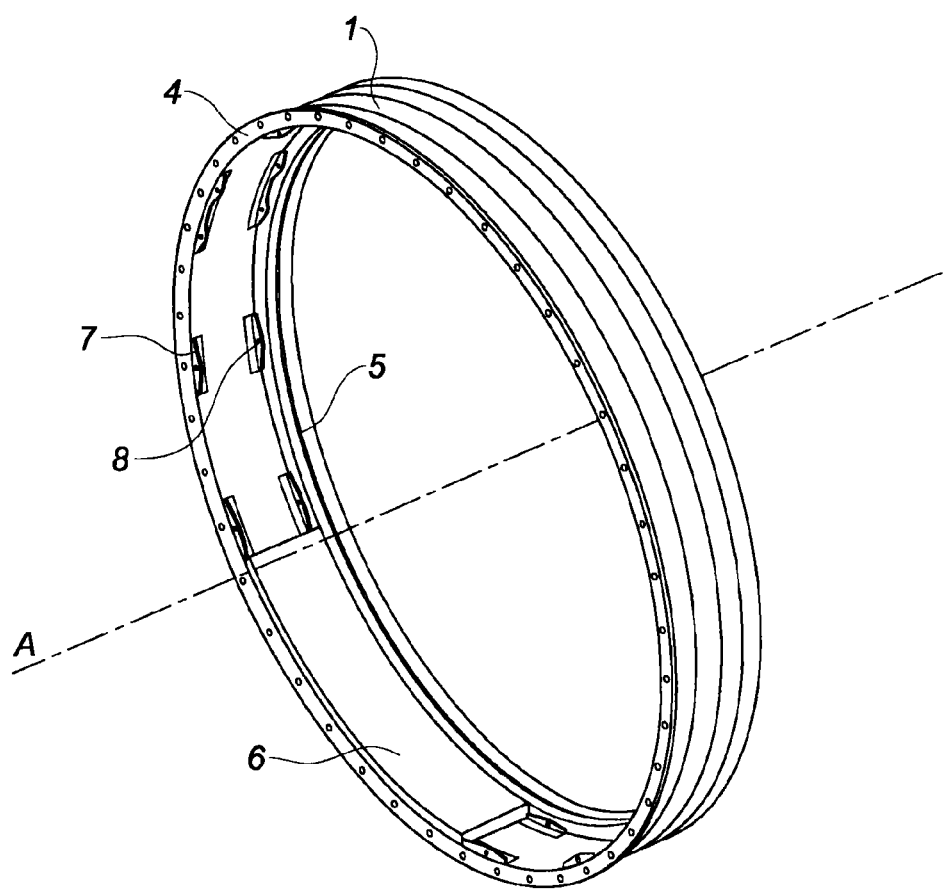
FIG. 2 is a perspective view of the region to be filled with an acoustic material with a panel which is mounted according to a first embodiment of the invention.

FIG. 2 shows the region that must be filled with an acoustic material. It forms an annular space delimited on the external circumferential face thereof by the inside of the casing 1 and on the internal face by the surface of the air duct. Upstream, this space is delimited by the intake plane of the casing, that is to say the plane that is perpendicular to the axis of the casing passing through the external face of the flange 4 since, when the turbojet engine is assembled, it is the internal coating of the nacelle 2 that reconstitutes the air intake duct upstream. Towards the downstream end, this annular space is delimited by the front face of a ring 5 fixed to the casing, which reconstitutes the air duct downstream.

The acoustic coating in this annular space consists for example of six panels 6 fixed to the casing, one of which is depicted. A number that is different from six can be envisaged but this constitutes a good compromise between the fact that the panels are contiguous in order to optimise the acoustic coating and that at least one of them must be able to be detached easily from the casing inwards when all of the panels are in place, for assembly and disassembly operations.

To fit in the annular space, each panel 6 is therefore curved along the axis A of the jet engine in order to have the same curvature as the inside of the casing on the external curved face 61 thereof, the lateral faces thereof are parallel to this axis A and the transverse faces thereof, which are defined as the upstream 64 and downstream 63 faces when the panel is positioned in the casing, delimit said panel in the axial direction.

The external curved face 61 has a first series of recesses 9 on the side of the transverse downstream face 63 and a second series of recesses 12 on the side of the opposite upstream transverse face. These recesses do not open onto the internal curved face 62 of the panel. The downstream recesses 9 each comprise a means of attachment by embedding and the upstream recesses 12 each comprise a means of attachment by locking. The functioning of these attachment means with the fixing means for connecting the panel to the casing is detailed below.

Each panel 6 is fixed to the casing by two series of connections, connections located upstream and others located downstream. Each of these connections is produced by a fixing means on the casing and an attachment means on the panel that cooperate. Preferentially, the fixing means upstream 7 and downstream 8 are located at the corresponding ends of the annular space.

In a first embodiment, the fixing means on the casing take the form of independent legs aligned on two circles and each panel is fixed to the casing by three connections upstream and three connections downstream. Variants can be envisaged, for example either with a different number of connections or with different forms where the fixings in a series are connected in a ring.

Advantageously, as can be seen in FIG. 2 as well as in the following ones, the fixing means 7 and 8 are fixed to the casing and are inside the annular space occupied by the panels 6. They therefore have no interaction with the adjacent structures, the ring 5 downstream, the nacelle 2 or the flange 4 upstream.

Preferentially, these fixing means are bonded to the casing. This solution preserves the mechanical integrity of the casing better than riveting, in particular when the casing is made from composite material.

To each series of fixing means on the casing there corresponds a series of attachment means on the panels designed to confer different functionalities on the connection depending on whether it is upstream or downstream. These means are described below with the connection made.

Figure 3:
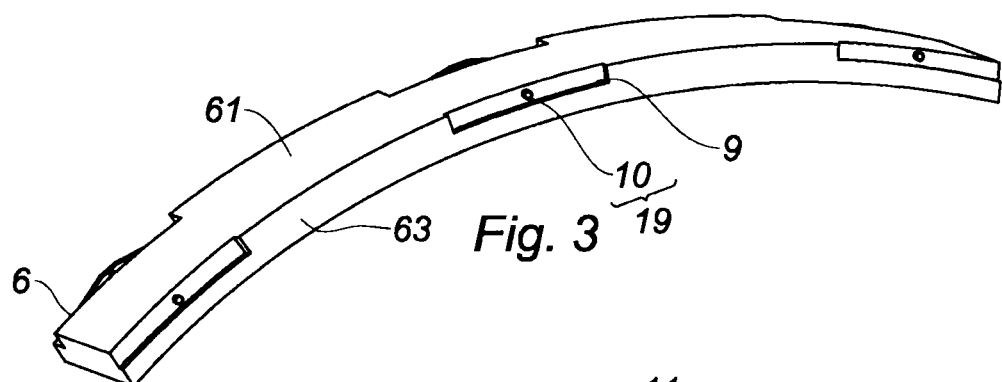
FIG. 3 is a perspective view of a panel having the attachment means on the downstream panel according to a first embodiment of the invention.
Figure 4:
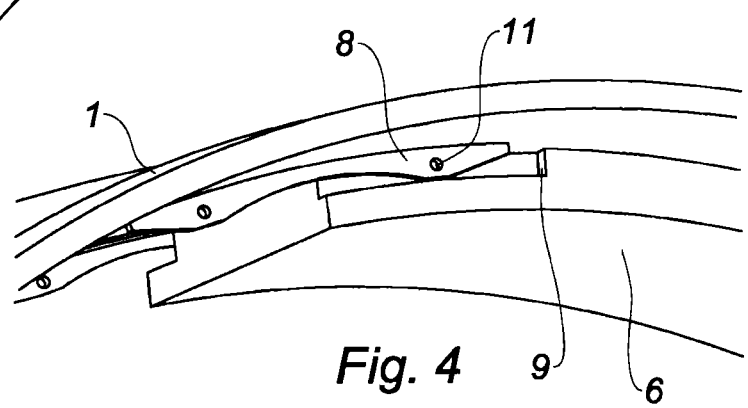
FIG. 4 is a view of the downstream side of the panel with the attachment means thereof embedded in the corresponding fixing means on the casing according to a first embodiment of the invention.
Figure 7:
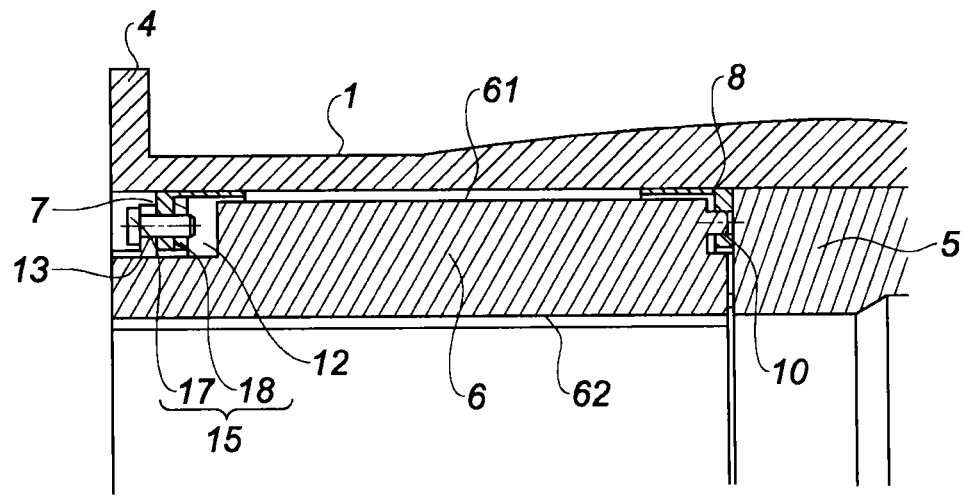
FIG. 7 is an axial sectional view of the panel fixed to the casing at the upstream and downstream connections according to a first embodiment of the invention.

In order to describe a downstream connection, FIG. 3 shows a perspective view from downstream of a panel alone and FIG. 4 shows a downstream connection produced with a fixing means and the corresponding attachment means. The fixing means 8 on the casing comprises a flat leg that is perpendicular to the axis of the casing, the height of which is appreciably less than the thickness of the annular space to be filled in. This leg has a hole 11 in it. The attachment means 9 of the corresponding panel is provided in a first recess 9 on the external curved face 61 going as far as the downstream face 63, and comprises a pin 10 turned towards the downstream end, with a length that is less than the length of the recess in the axial direction. The recess 9 is designed to allow the leg of the fixing means 8 to pass:

it starts from the external circumferential face 61 of the panel with a height that is at least equal to that of the leg of the fixing means 8, the width thereof is at least equal to that of the leg of the fixing means, it opens onto the corresponding transverse face 63 and the length thereof in the axial direction corresponds to the distance of the downstream face of the fixing leg from the downstream edge 63 of the panel when it is in position, as can be seen in FIG. 7.

Naturally the recess 9 is located on the panel so as to surround the fixing leg 8 when the panel is positioned in the annular space and so that the pin 10 enters the hole 11 of the downstream fixing means.

In this way, the fixing means 8 on the casing and the downstream attachment means 19 form, when they are embedded, a connection that locks all movement except an axial upstream translation. In addition, the connection is broken when this upstream translation takes place over a greater distance than the length of the pin 10.

The pin forms the embedding member 10 of the attachment means 19. In the example described the cross section of the pin 10 is circular but other embodiments are conceivable. In particular, the embedding member 10 of the attachment means may be female, and the embedding member 11 of the fixing means will then be male. In a variant, the fixing leg 8 could comprise a pin that is embedded in a hole formed at the bottom of the recess 12. In addition, these embedding members 10 and 11 are the members of the attachment means and of the fixing means respectively, which precisely position the downstream panel. In addition, the attachment means 19 inside said recess 9 may comprise a plurality of individualised embedding members 10.

Advantageously, the form of the embedding member 10 with respect to the embedding member 11 of the fixing means is such that they fit together by force and so that the panel is thus maintained by a "vice effect". Tight assembly of this type affords a more precise positioning of the panels.

Figure 5:
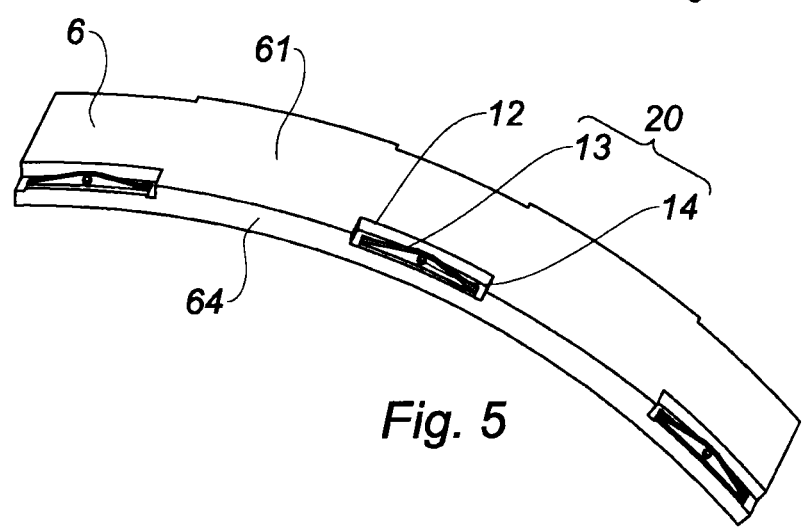
FIG. 5 is a perspective view of a panel having the attachment means on the panel upstream according to a first embodiment of the invention.
Figure 6:
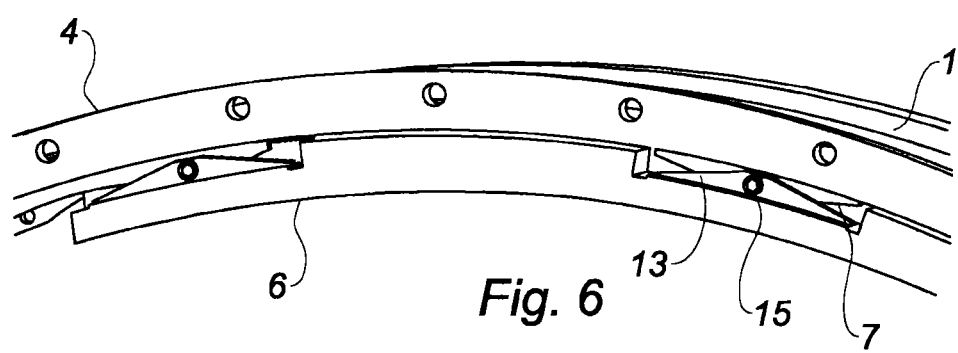
FIG. 6 shows a view of the upstream side of the panel with the attachment means thereof clamped in the corresponding fixing means on the casing according to a first embodiment of the invention.

In order to describe the series of upstream connections, FIG. 5 is a perspective view of the upstream end of a panel alone and FIG. 6 is an upstream connection made by a fixing means and the corresponding attachment means secured together by applying a locking means. The upstream fixing means 7 on the casing comprises a leg with the same shape as that of the downstream fixing means 8. This leg also has a hole 16 in it, which is not depicted in the figures. The corresponding attachment means 20 of the panel is provided in a second recess 12 on the external face 61 going as far as the upstream transverse face 64, opposite to the downstream transverse face, and consists of a flat leg 13 that is perpendicular to the axial direction, with a hole 14 in it. The hole 14 is the positioning member in which the screw 17 of the locking means 15 will pass.

The recess 12 is designed to allow the leg of the upstream fixing means 8 to pass:

it starts from the external circumferential face 61 of the panel with a height that is at least equal to that of the leg of the fixing means, the width thereof is at least equal to that of the leg of the fixing means, it opens onto the corresponding transverse face 64 and the length thereof in the axial direction corresponds to the distance of the downstream face of the leg of the fixing means 7 from the upstream edge 64 of the panel when it is fixed to the casing plus a length that is at least equal to the length of the embedding member 10 of the downstream attachment means 19 of the panel, as can be seen in FIG. 7.

The flat leg 13 is located at a distance from the downstream bottom of the recess 12 such that it is external to the upstream fixing leg 7 and contiguous with it when the panel is fixed to the casing, as shown by FIG. 7.

Naturally, the recess 12 is located on the panel so as to surround the fixing leg 7 when the panel is positioned in the annular space and so that the hole 14 in the flat leg 13 faces the hole 16 in the leg of the fixing means 7. The holes 14 and 16 are the members of the attachment means and fixing means respectively that position the upstream panel precisely.

The fixing means 7 on the casing and the attachment means 20 on the panel are then secured by a locking means 15 consisting of a screw 17 and a plate forming a nut 18. The holes 14 and 16 are the members of the attachment means and the fixing means respectively that position the upstream panel precisely.

Preferentially, the cross section of the recess 12 is constant, from the opening thereof on the upstream face 64 to the opposite edge thereof. It can be said that this cross section is substantially constant if the size of the variations in shape of the cross section can be judged to be small compared with that of the smallest of the extensions of the recess 12 in the three dimensions. This feature makes it possible, in particular with the length of the recess 12 in the axial direction as described, to move the panel in axial translation against the casing in order to engage or disengage the embedding of the downstream connection.

In addition, the size of the opening of the recesses 12 for the upstream connection gives access, through the upstream face 64 of the panel 6, to the screw 17 when it is in place in the hole 14 in the flat leg 13. The head of the screw 17 is outside, it is accessible through the upstream face of the panel 6 in order to lock the connection by effecting the clamping as long as the casing 1 is not assembled on the nacelle 2, the nut plate 18 having a shape that locks the rotation thereof in the cavity formed from the bottom of the recess 12 behind the fixing means 7 and delimited by the casing 1.

In this way, the fixing means 7 on the casing and the upstream attachment means 20 form, when the locking means 15 are applied, a connection that locks all of the movements. On the other hand, when the locking means 15 are not applied, in particular with the screw 17 removed, the connection allows an axial forward translation over a distance that is at least equal to the length of the embedding member 10 and a radial translation towards the axis of the casing that moves the panel away from the casing.

Advantageously, the configuration presented for the upstream connection means makes it possible to apply the locking means in the axial direction. This makes it less vulnerable to the deformations suffered during the functioning of the turbojet engine in flight and therefore makes the connection more robust. This also gives easy access from upstream in order to introduce the screw and perform the clamping operation.

As depicted in FIG. 7, the plate 18 is located inside the space that is left free between the upstream fixing leg 7 and the bottom of the recess 12.

FIG. 7 and FIGS. 4 and 6 show that the recesses minimise the space requirement for the fixing system, having regard to the minimum size necessary for the fixing legs in order to guarantee the firmness of the connections. This embodiment therefore corresponds to a panel arranged so as to entirely fill with acoustic absorption material the portion of the annular space that it occupies, contiguously with the upstream and downstream faces of said annular space, with the exception of recesses containing the attachment means, said recesses being open on the external face 61 of the panel facing the casing but not reaching the internal surface 62 of the panel. In a complementary manner, the form of the panel, as can be seen in the figures, is designed so that the panels are contiguous when they are fixed and so that there is no discontinuity between the internal surfaces thereof. This configuration optimises the filling of the annular space with absorbent material and the homogeneity thereof. It also minimises the size of the joins. Thus the great discontinuities in acoustic impedances that may be sources of noise are eliminated.

Advantageously, each panel having a form that has no void between the locking means 15 and the internal circumference 62 thereof delimiting the air duct, it can be seen in FIG. 7 that, when the panels are fixed and the casing is in place in the nacelle, the screws 17 and the plates 18 of the locking means 15 are isolated from the air duct. They therefore do not risk escaping therefrom and causing damage in the blades if they become loosened.

The mounting of an acoustic panel on the fan casing when it is disconnected from the nacelle in such a device is done by means of the following steps:

the panel 6 is introduced through the inside against the casing 1 so that the attachment means 19 thereof for the downstream connections are offered up in front of the fixing means 8 of the casing with which they cooperate, the attachment means 19 for the downstream connections are embedded in the fixing means 8 with which they cooperate so that the attachment means 20 of the upstream connecting panel are offered up in front of the fixing means 7 on the casing with which they cooperate, the locking means 15 are applied between the fixing means 7 and the attachment means 2 of the panel.

The term "offered up" means here that the attachment means and the fixing means are placed one against the other so that the members thereof that must cooperate touch each other.

Using the features of the first embodiment, the steps of mounting the panels in the fan casing of the turbojet engine, when the nacelle 2 is removed, are performed as follows:

1. For offering up the attachment means 19 facing the downstream-connection fixing means 8: the panel 6 is introduced between the two rows of fixing means provided in the fan casing, and then the panel 6 is pressed towards the casing 1 so that the three holding pins 10 thereof are facing the holes 11 that are designed to receive them in the fixing means 8 on the casing. Upstream, the leg of the fixing means 8 is inserted inside the recess 12.
2. The embedding of the downstream connection and the offering up of the attachment means 20 of the panel in front of the fixing means 7 of the upstream connection is done in a single movement: the panel is translated axially in order to introduce the pins 10 under pressure in the holes 11 for tight fitting (a specific tool of the extractor type has to be provided for removal). This movement also has the effect of offering up, for the upstream connection, the holes 14 of the attachment means in front of the holes 16 of the fixing means 7.
3. With regard to the locking, the screws 17 are tightened by means of the plate 18 provided for this purpose. Moreover, the plate 18 would previously have been introduced into the recess 12 of the panel 6 before mounting, and the same will apply for all of the plates 18 during the mounting of the last panel.

In a preferential method for manufacturing the device, the positioning members on the fixing means, in the particular embodiment described, the holes 11 and 16 in which the pins 10 and the screws 17 pass, are machined once the fixing means are positioned on the casing. This method makes it possible to obtain a precise circumferential alignment of the connecting points, which corrects the generally large shape defects related to the manufacturing of the casing in composite material. In addition, if the aerodynamic profile of the air duct is axisymmetric, this makes it possible to produce identical panels whatever the position thereof on the casing, which has a certain advantage for the manufacture, stock management and maintenance related to this part.

The invention also functions with other forms of attachment means, as shown by the second embodiment described below for filling the annular space indicated in FIG. 1.

Figure 8:
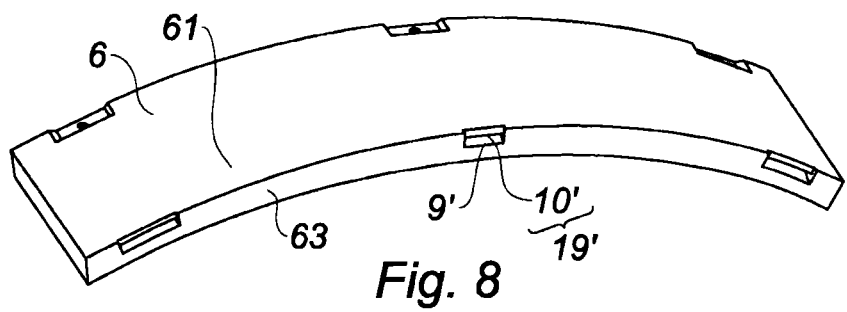
FIG. 8 is a perspective view of a panel having the attachment means on the downstream panel according to a second embodiment of the invention.

The arrangement of the panels and the fixing means is similar therein to what was described in FIG. 2 for the first embodiment. The form of the fixing means 7' and 8' differs and will be described in more detail with the explanation of the downstream and upstream connections. To make the downstream connection, depicted in FIG. 9, the fixing means 8' on the casing forms a flat hook, attached to the casing by a transverse plate, with a return 11' turned upstream. The height of the hook is appreciably less than the thickness of the annular space to be filled in. The axial extension of the plate of the fixing means 8' against the casing is greater than that of the return 11' in order to slide therein the embedding member 10' of the panel. The attachment means 19' of the corresponding panel, depicted in FIG. 8, is provided in a recess 9' located on the external curved face 61 going as far as the downstream face 63, and a strip 10' closing off the recess 9' on the external curved face.

Figure 12:
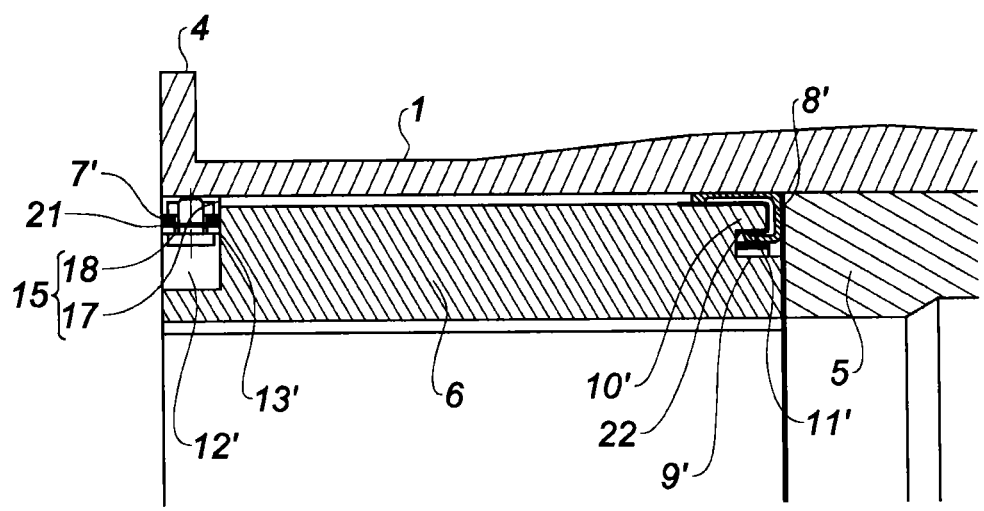
FIG. 12 is an axial sectional view of the panel fixed to the casing at the upstream and downstream connections according to a second embodiment of the invention.
Figure 9:
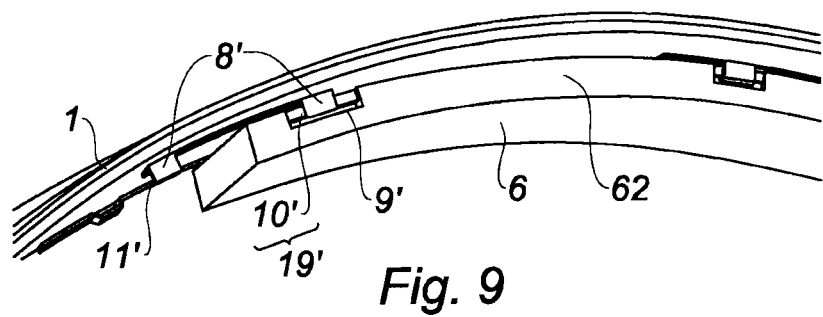
FIG. 9 is a view of the downstream side of the panel with the attachment means thereof embedded in the corresponding fixing means on the casing according to a second embodiment of the invention.

The recess 9' is designed so as to allow the fixing means 8' to pass, as in the first embodiment, and to allow small lateral translation movements about it when the panel is embedded in order to adjust the position thereof with respect to the upstream fixing means. In particular:

the width thereof is greater than that of the hook of the fixing means, it opens onto the corresponding transverse face 63 and the length thereof in the axial direction is at least equal to the distance of the upstream return end 11' from the downstream edge of the panel when it is in position, as can be seen in FIG. 9 and FIG. 12.

The strip forms the embedding member 10' of the attachment means 19'. It is fixed to the edges of the recess 9' in continuity with the external face of the panel; it can also be produced in one piece with the panel. The thickness and extension thereof in the axial direction correspond to the internal dimensions of the hook of the fixing means 8', so that it is inserted therein.

Preferably, the recess 9' leaves a sufficient separation relative to the return 11' of the hook to allow a rotation movement of the panel about an axis that is perpendicular to the axis of the casing at the connection. This movement is assisted, at the interface between the strip and the hook, by small beads at the end of the portion of the hook fixed to the casing. This leaves a small space on the casing side that enables the strip to turn slightly in the hook and then to slide. During disassembly, the connection is broken when the strip 10' is detached from the hook of the fixing 8'.

Advantageously, the form of the strip 10' and the elasticity of the hook with the plate forming the return 11' are such that the strip enters the hook forcibly and is thus held therein by a "vice effect".

Figure 10:
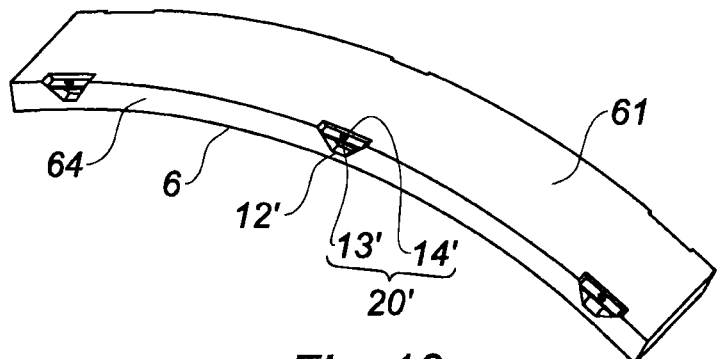
FIG. 10 is a perspective view of a panel having the attachment means on the upstream panel according to a second embodiment of the invention.
Figure 11:
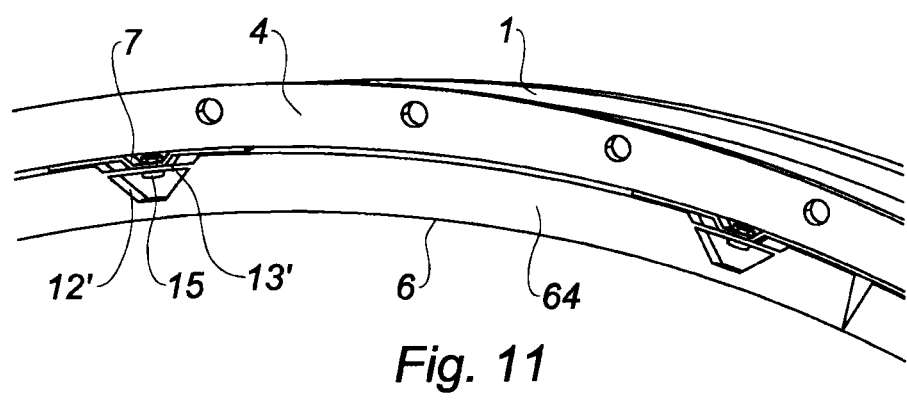
FIG. 11 is a view of the upstream side of the panel with the attachment means thereof clamped in the corresponding fixing means on the casing according to a second embodiment of the invention.

In order to effect the upstream connection, depicted in FIG. 11, the fixing means 7' consists of a blade attached at the circumference inside the casing, forming at the middle thereof a plate with a hole 16 therein, which is not shown in the figures, in order to allow a screw to pass and which is separated from the casing so as to make it possible to insert the end of a screw and the nut thereof in the gap. The corresponding attachment means 20' of the panel, depicted in FIG. 10, is provided in the second recess 12' on the upstream face towards the outside and consists of a flat leg 13' parallel to the circumference, with a hole 14' in it. The recess 12 is designed so as to allow the plate of the upstream fixing means 8' to pass:

it starts from the external circumferential face of the panel 61 and has the flat leg 13' passing through it at a distance such that the external radial edge of the flat plate 13' is in contact with the internal radial edge of the plate of the fixing means 7', it has a width in the circumferential direction and a depth in the axial direction that are at least equal respectively to those of the plate of the fixing means, it opens onto the corresponding transverse face 64 and the total height thereof in the radial direction is sufficient to be able to pass a fixing screw 17 in front of the flat leg 13' relative to the axis A.

As is shown in FIG. 12, when the clamping means 15 is applied through the holes 14' and 16', the nut 18 is located inside the space that is left free between the plate of the upstream fixing means 7' and the casing 1; in addition the head of the screw 17 and the nut 18 are therefore accessible through the upstream face of the panel 6.

Advantageously, adjustment means in the form of plates 21 and 22 are provided for adjusting the separation of the panel at each connection. The way of interposing them in the upstream and downstream connections of this embodiment is shown in FIG. 12.

Using the features of this second embodiment, the steps for mounting a panel are carried out as follows:

1. For offering up the attachment means 19' facing the fixing means 8' of the downstream connections: the panel 6 is introduced aslant in the fan casing, so that the three downstream holding strips 10' thereof are inserted in the fixing hooks 11' that are designed to receive them.
2. The embedding of the downstream connection and the offering up of the attachment means 20' of the panel in front of the fixing means 7' of the upstream connection is done in a single movement: the panel is pivoted and pressed against the upstream fixing means 7'. In this way, the downstream fixing hooks 11' are constrained and offer effective holding of the panels.
3. With regard to locking, the screws 17 are clamped by means of the nut 18 that is provided for this purpose.

Advantageously, in this second embodiment, in order to correct the shape defects of the casing and to use, where applicable, identical panels, shims 22 and 21 can be introduced respectively during steps of embedding the downstream connection and of pressing the upstream connection.

The two embodiments that have been described can give rise to variants by combining the downstream and upstream fixing types thereof.

The invention has been described for the case where the annular space to be filled with the acoustic panels is located on the upstream portion of the fan casing. It can however easily be transposed, as far as the mounting method, to the case where the annular space is located at the downstream end of the casing. It suffices in this case to reverse the downstream and upstream functions in relation to the first and second recesses of each panel.

In cases where the annular space is distant from the end, the invention can be used. The mounting method is applicable when the structure that is located facing said second recesses when the panel is positioned on the casing is itself removable.

The invention claimed is:

1. An acoustic panel to be fixed internally to a fan casing of a turbojet engine, comprising an external face and an internal face both of which are curved about an axis and two axially opposed transverse faces, the external curved face having at least one first recess on a side of a first transverse face and at least one second recess on a side of the opposite transverse face, said recesses each comprising an attachment means and not opening onto the internal curved face of the panel, wherein one of said attachment means is provided in said first recess and comprises at least one axial embedding member, male or female.

2. The acoustic panel according to claim 1, in which the axial embedding member fits flush with the external curved face.

3. A turbojet engine comprising a fan casing, at least two acoustic panels according to claim 2, in which the attachment means which is provided in said second recess is arranged so that said locking means is applied in the axial direction, fixing means that are capable of cooperating with the attachment means that are provided in said first and second recesses and radial adjustment means for holding the panels against the internal wall of the casing.

4. The acoustic panel according to claim 3, wherein the locking means comprise a screw.

5. The acoustic panel according to claim 1, in which an attachment means that is arranged so as to contain at least one locking means is provided in said second recess, said second recess opening onto the corresponding transverse face through an opening with a cross section that is substantially equal to the maximum cross section of said recess.

6. The acoustic panel according to claim 5, in which the attachment means which is provided in said second recess is arranged so that said locking means is applied in the axial direction.

7. The acoustic panel according to claim 6, wherein the locking means comprise a screw.

8. The acoustic panel according to claim 5, in which the attachment means provided in said second recess is arranged so that said locking means is applied in the radial direction.

9. A turbojet engine comprising a fan casing, at least two acoustic panels according to claim 1, and fixing means that are capable of cooperating with the attachment means that are provided in said first and second recesses in order to hold the panels against an internal wall of the casing.

10. The turbojet engine according to claim 9, in which said acoustic panels are arranged at one end of the casing, having towards said end the transverse face thereof, which is located on the side of the second recess.

11. The turbojet engine according to claim 9, in which the fixing means are rigidly connected to the casing and are located in the annular space occupied by said panels.

12. The turbojet engine according to claim 11, in which the fixing means are bonded to the casing.

13. The turbojet engine according to claim 9, in which said at least two panels are identical.

14. A method for mounting an acoustic panel in a fan casing of a turbojet engine according to claim 9, comprising:
  introducing said panel through an inside against the casing so as to offer up the attachment means of said first recess in front of the fixing means with which it cooperates,
  embedding the attachment means of said first recess in the fixing means with which it cooperates so that the attachment means of said second recess is offered up in front of the fixing means with which it cooperates, and
  applying said locking means between the fixing means and the attachment means of said second recess.

15. An acoustic panel to be fixed internally to a fan casing of a turbojet engine, comprising an external face and an internal face both of which are curved about an axis and a first transverse face axially opposed to a second transverse face not opening onto the internal curved face of the panel,
  the external curved face having at least two first recesses and at least two second recesses,
  the first transverse face having at least two first lateral recesses in which one first recess opens,
  the second transverse face having at least two second lateral recesses,
  each first and second recess comprising an attachment element, and
  one of the attachment elements being arranged inside said first recess and comprises at least one axial embedding member, male or female.

16. An acoustic panel to be fixed internally to a fan casing of a turbojet engine, comprising an external face and an internal face both of which are curved about an axis and a first transverse face axially opposed to a second transverse face not opening onto the internal curved face of the panel,
  the external curved face having at least one first recess and at least one second recess,
  the first transverse face having at least one first lateral recess in which one first recess opens,
  the second transverse face having at least one second lateral recess,
  each first and second recess comprising an attachment element, and
  one of the attachment elements being arranged inside the second recess, and separating at least a part of the second recess into two portions.

* * * * *